(12) United States Patent
Webb

(10) Patent No.: US 9,774,366 B2
(45) Date of Patent: Sep. 26, 2017

(54) INTERFERENCE MITIGATION

(75) Inventor: William Webb, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 651 days.

(21) Appl. No.: 14/125,843

(22) PCT Filed: Jun. 11, 2012

(86) PCT No.: PCT/EP2012/060979
§ 371 (c)(1),
(2), (4) Date: Jul. 2, 2014

(87) PCT Pub. No.: WO2012/171867
PCT Pub. Date: Dec. 20, 2012

(65) Prior Publication Data
US 2014/0321509 A1 Oct. 30, 2014

(30) Foreign Application Priority Data

Jun. 13, 2011 (GB) .................................. 1109850.6
Sep. 30, 2011 (GB) .................................. 1116910.9

(51) Int. Cl.
H04B 1/715 (2011.01)
H04W 72/08 (2009.01)
H04W 72/12 (2009.01)

(52) U.S. Cl.
CPC ........ *H04B 1/715* (2013.01); *H04W 72/1231* (2013.01); *H04B 2001/7154* (2013.01); *H04W 72/082* (2013.01); *H04W 72/1215* (2013.01)

(58) Field of Classification Search
CPC .......... H04W 72/082; H04W 72/1215; H04W 72/1231; H04B 1/715; H04B 2001/7154
USPC ......................................................... 375/133
See application file for complete search history.

(56) References Cited

U.S. PATENT DOCUMENTS 6,621,454 B1 * 9/2003 Reudink ............. H01Q 3/2605
342/367
2009/0257396 A1 10/2009 Eliezer et al.

FOREIGN PATENT DOCUMENTS

| EP | 1137299 A2 | 9/2001 | |
| EP | 1850611 A1 | 10/2007 | |
| EP | 2190126 A1 | 5/2010 | |
| GB | 2474935 A | 5/2011 | |
| WO | 2007009043 A1 | 1/2007 | |
| WO | WO2007009043 | * 1/2007 | ............. H04B 1/715 |
| WO | 2009029440 A1 | 3/2009 | |

* cited by examiner

Primary Examiner — Andrew Lai
Assistant Examiner — Leon Andrews
(74) Attorney, Agent, or Firm — Slater Matsil, LLP

(57) ABSTRACT

A communication device for communicating with a plurality of terminals using a frequency hopping sequence, the communication device being configured to determine that one of the plurality of terminals is subject to interference on a frequency in the frequency hopping sequence and to, in response to that determination, schedule communication with that terminal to avoid that frequency.

17 Claims, 5 Drawing Sheets

INTERFERENCE MITIGATION

The invention relates to mitigating interference in a network that uses frequency hopping.

A wireless network may be configured to operate without having been specifically allocated any part of the electromagnetic spectrum. Such a network may be permitted to operate is so-called white space: a part of the spectrum that is made available for unlicensed or opportunistic access. Typically white space is found in the UHF TV band and spans 450 MHz to 800 MHz, depending on the country. A large amount of spectrum has been made available for unlicensed wireless systems in this frequency range.

A problem with operating in white space is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of white space that can be used by unlicensed systems). The FCC has mandated that systems operating in the whitespace must reference a database that determines which channels may be used in any given location. This is intended to avoid interference with the TV transmissions and certain other incumbent systems such as wireless microphones.

For TV receivers (including those for digital TV (DTV)), there will inevitably be adjacent channels on which a strong transmission close to the TV receiver will interfere with TV reception. For example, the TV receivers may have image frequencies and poor adjacent channel rejection (ACR) on certain frequencies due to spurs on their local oscillators and limitations in their receive filters. These frequencies are often dependent on the specific receiver implementation and so are not amenable to being avoided through the database system.

Digital TV typically uses a channel bandwidth of 6 to 8 MHz. It also uses OFDM modulation in which the overall channel bandwidth is split into a large number of narrower channels (so-called sub-carriers), each of which is individually modulated. The system is designed so that, if a certain number of sub-carriers are subject to multipath fading, with the result that their signal-to-noise ratio is poor, the overall data can still be recovered. This is typically achieved by using interleaving and error correction codes, which mean that bit errors localised to a limited number of sub-carriers can be corrected. OFDM modulation can therefore achieve considerable robustness to multipath fading.

OFDM is only able to recover the transmitted data when the interferer is relatively narrowband compared with the bandwidth of the overall TV signal, such that a limited number of sub-carriers are affected. OFDM does not provide a similar performance benefit when the interferer occupies a relatively large proportion of the DTV channel bandwidth because in this case the error control coding may be incapable of correcting the bit errors due to the higher proportion of bits that may be corrupt. If the bandwidth of the transmitted signal from the terminal can be reduced to a small fraction of the DTV channel bandwidth, there is a lower chance of the DTV receiver being unable to decode the signal correctly. Another perspective on this is that the narrowband whitespace transmitter can be located much closer to the DTV receiver before causing noticeable degradation of the decoded DTV signal. This can be of particular benefit for mobile or portable whitespace devices whose exact location and antenna orientation cannot be easily constrained.

There is a potential issue with reducing the bandwidth occupied by the whitespace device's transmitter: transmitting on a narrow bandwidth channel makes the whitespace device sensitive to poor reception due to multipath fading. This is because the entire bandwidth could be in a long-term fade (lasting multiple frames), resulting in poor signal-to-noise ratio.

Both of these problems may be addressed using frequency hopping. Frequency hopping minimises the interference to TV reception, since no communication will be permanently causing interference to any given TV receiver. Frequency hopping also reduces the probability of the terminal being in a long-term fade. It provides a form of interleaving that enables more efficient error correction to be used.

The channels used for frequency hopping may be selected by the base station based upon information from the white space database on the available channels and associated power levels (which in turn are based upon the licensed spectrum use in the area). However, the white space database does not include information about localised interference that may affect some but not all of the terminals in a cell. For example, a terminal located in the boundary region between two cells may experience interference from the neighbouring cell to the one in which it is operating. Another terminal may experience interference from a device operating in its vicinity but outside of the wireless network, e.g. a Wi-Fi device. This localised interference may result in communications between the terminal and the base station on the interfered frequency being lost.

There is therefore a need for an improved frequency hopping mechanism.

According to a first embodiment of the invention, there is provided a communication device for communicating with a plurality of terminals using a frequency hopping sequence, the communication device being configured to determine that one of the plurality of terminals is subject to interference on a frequency in the frequency hopping sequence and to, in response to that determination, schedule communication with that terminal to avoid that frequency.

The communication device may be configured to avoid the frequency by assigning the next communication between the communication device and the terminal to be in a time slot that is, in accordance with the frequency hopping sequence, not scheduled to take place on that frequency.

The communication device may be configured to avoid the frequency by identifying a time period within which a communication should take place between the communication device and the terminal and assigning the communication to take place in a time slot within that time period that is, in accordance with the frequency hopping sequence, not scheduled to take place on that frequency.

The communication device may be configured to avoid the frequency by determining that the next transmission slot assigned for communication between the communication device and the terminal is, according to the frequency hopping sequence, scheduled to take place on that frequency and in response to that determination, not communicating with the terminal in that next assigned transmission slot.

The communication device may be configured to assign a series of time slots to communication between it and the terminal.

The communication device may be configured to avoid the frequency by skipping any time slot in the assigned series that is, according to the frequency hopping sequence, scheduled to take place on that frequency.

The communication device may be configured to indicate to the terminal that it should skip a time slot that is scheduled to take place on the frequency.

The communication device may be configured not to indicate to the terminal that it should skip a time slot that is scheduled to take place on the frequency.

The communication device may be configured to determine that the terminal is subject to interference on the frequency in dependence on information received from the terminal.

The communication device may be configured to determine that the terminal is subject to interference on the frequency in dependence on one or more messages transmitted by the communication device to the terminal that the terminal has not acknowledged.

The communication device may be configured to communicate with the plurality of terminals via a wireless network that operates in white space.

The communication device may be configured to communicate with the plurality of terminals via a wireless network that is configured for machine-to-machine communication.

The communication device may be configured to determine that the interference to which the terminal is subject affects only a subset of one or more of the plurality of terminals.

The communication device may be configured to continue scheduling communications with terminals not comprised in the subset to use the frequency in accordance with the frequency hopping sequence.

According to a second embodiment of the invention, there is provided a terminal for communicating with a communication device using a frequency hopping sequence, the terminal being configured to determine that it is subject to interference on a frequency in the frequency hopping sequence and to, in response to that determination, schedule communication with communication device to avoid that frequency.

The terminal may be configured to determine that it is subject to interference on the frequency in dependence on information received from the communication device.

The terminal may be configured to determine that it is subject to interference on the frequency in dependence on a communication from the communication device that it did not receive successfully.

The terminal may be configured to communicate with the communication device in a series of time slots assigned by the communication device, the terminal being configured to avoid the frequency by skipping any time slot in the assigned series that is, according to the frequency hopping sequence, scheduled to take place on that frequency.

The terminal may be configured to skip the assigned time slot responsive to instructions from the communication device.

The terminal may be configured to skip the assigned time slot independently of any instructions from the communication device.

According to a third embodiment of the invention, there is provided a method for scheduling communications between a communication device and a plurality of terminals using a frequency hopping sequence, the method comprising determining that one of the plurality of terminals is subject to interference on a frequency in the frequency hopping sequence and to, in response to that determination, scheduling communication between the communication device and that terminal to avoid that frequency.

For a better understanding of the present invention, reference is made by way of example to the following drawings, in which.

A communication device and a terminal may be arranged to preferentially communicate on particular frequencies, in order to avoid frequencies on which the terminal is subjected to localised interference. The communication device and the terminal may be arranged to communicate using a frequency hopping sequence. If it is determined that the terminal is subject to interference on one of the frequencies in the hopping sequence, future communications between the communication device and the terminal may be scheduled to avoid the interfered frequency.

One or more embodiments of the invention will now be described with specific reference to a wireless network in which the communication device is a base station. Other embodiments will be described with specific reference to a wireless network in which the communication device is a terminal. This is for the purposes of example only and it should be understood that the mechanisms for communicating over a communication channel described herein may be implemented in any suitable communication device, irrespective of what particular role that device plays within the network.

Figure 1:
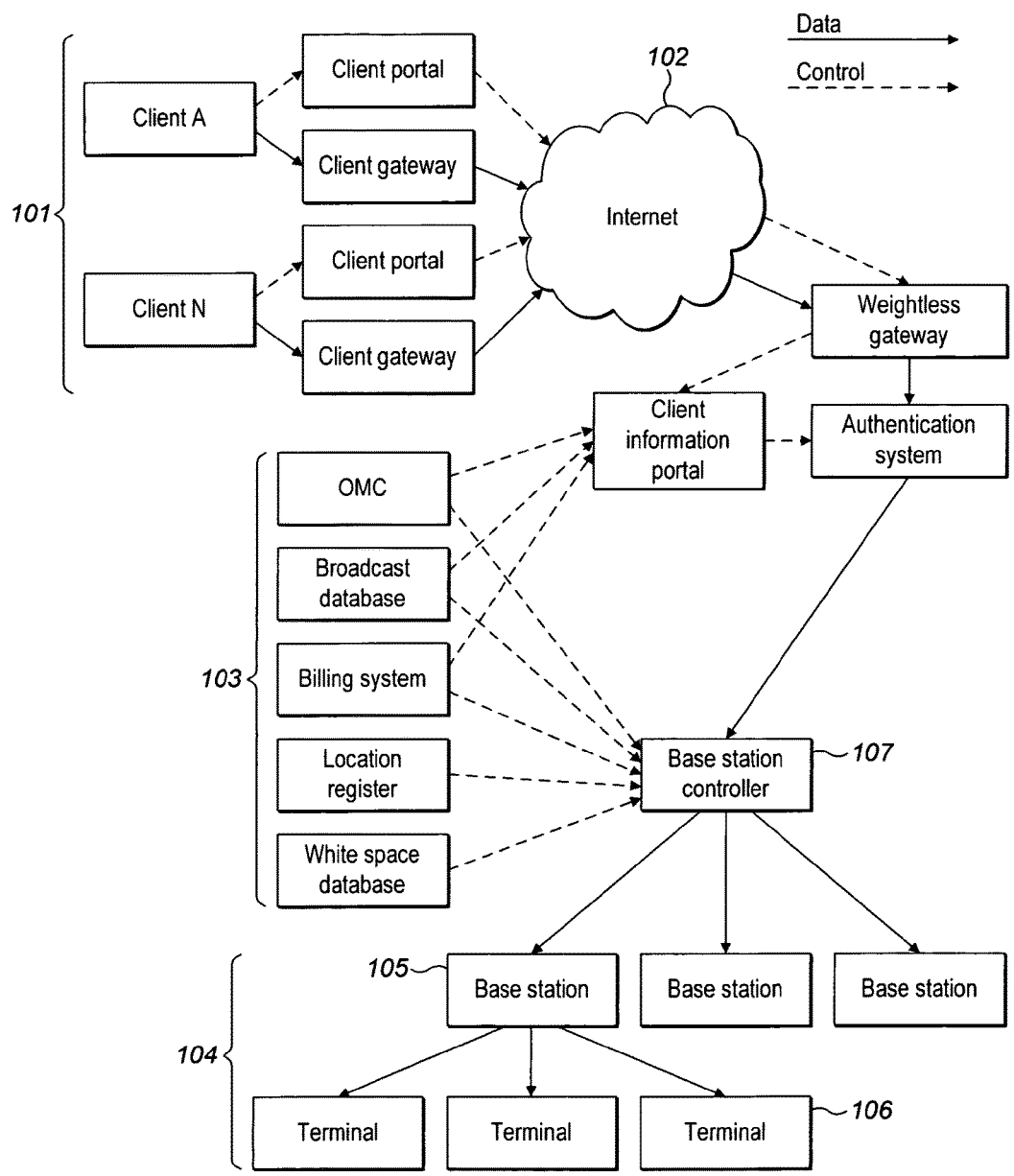
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are suitably entities embedded or machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. The network may be arranged to communicate with a client-facing portion 101 via the Internet 102. In this way a client may provide services to the terminals via the wireless network.

Other logical network elements shown in this example are:

Core network. This routes traffic information between base stations and client networks.

Billing system. This records utilisation levels and generates appropriate billing data.

Authentication system. This holds terminal and base station authentication information.

Location register. This retains the last known location of the terminals.

Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions.

Figure 2:
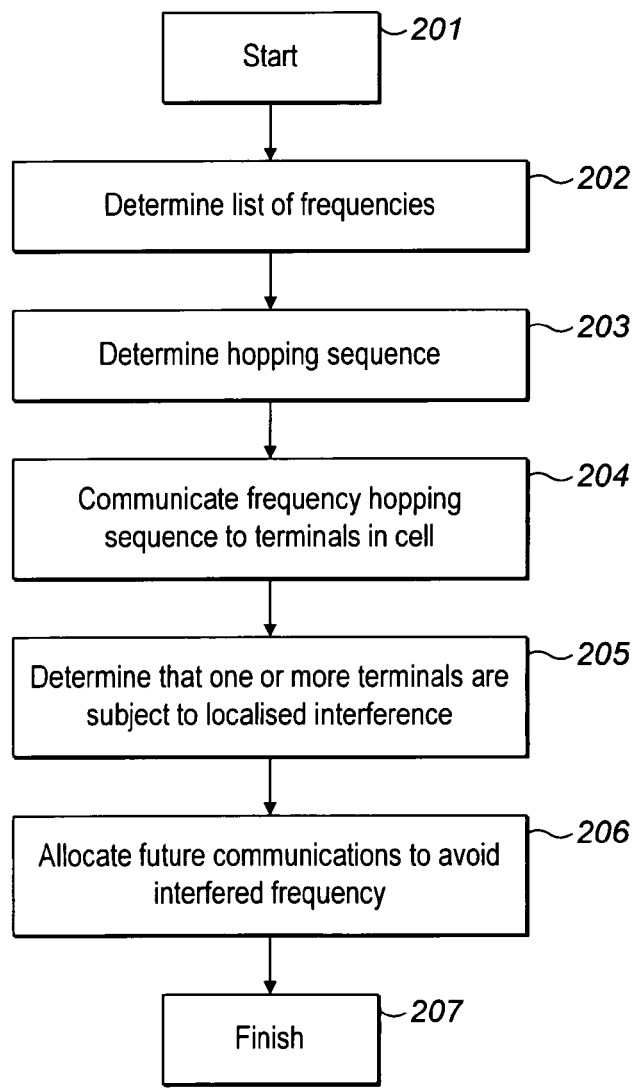
FIG. 2 shows an example of a frequency hopping sequence being determined.

An overview of a frequency hopping mechanism according to one embodiment of the invention is shown in FIG. 2. The process commences in step 201. In step 202, the base station determines a suitable list of frequencies for use in the frequency hopping sequence. In step 203, the base station determines a sequence using those frequencies. In step 204, the base station communicates the frequency hopping sequence to the terminals in the cell. In step 205, the base station determines that one or more of the terminals is subject to interference on a frequency hopping sequence. The base station allocates slots to future communications with those one or more terminals to avoid the interfered frequency (step 206). The process terminates in step 207. The individual steps of the process illustrated in FIG. 2 are described in more detail below.

The frequency hopping sequence may be determined by the base station and then communicated by the base station to the terminals so that the terminals know in advance which frequency they should listen to and/or transmit on. The base station may select the frequencies to be used for frequency hopping based upon information from the white space database on the available channels and associated power levels. The base station may also reject channels found to suffer poor propagation or throughput. Finally, the base station may reject any channels on which the presence of another user, operating outside of the wireless network, has been detected. The base station may use this combination of considerations to produce a final list of frequencies available to it for frequency hopping. This final list may be generated in dependence on factors that affect the cell as a whole and may not be influenced by localised interference that may affect only a few terminals in the cell.

Having generated a list of frequencies that are suitable for being used in the cell, the base station may be arranged to next determine in what order those frequencies should be used by the hopping sequence. The hopping sequence may be determined with reference to the sequences being used by neighbouring cells, in order to minimise interference suffered by terminals located in the boundary regions between cells. Neighbouring base stations are likely to have similar white space channel assignments. (As the distance between base stations increases, the assignments tend to change as the base stations are located in different TV service areas.) The hopping sequences and start points may be uncoordinated, so that all base stations randomly select hopping patterns and accept that there will be occasions where interference occurs between base stations. They may be self-coordinated, so that base stations listen to the hopping sequences of nearby base stations and select patterns that will minimise interference. Another option is for central coordination, so that central planning is used to assign hopping sequences that will minimise interference. Any of these options might be adopted, with the option of base stations and/or the network as a whole changing between them according to what is optimal at any particular point in time.

A preferred option for neighbouring base stations that use the same (or substantially the same) frequencies, is for those frequencies simply to be used in ascending or descending order. The offset that each base station applies to its own ascending or descending sequence (so that neighbouring base stations start their ascending or descending sequences at different frequencies to avoid direct clashes as far as possible) may be determined centrally. Where there is a direct clash, some messages may be lost.

Preferably the frequency hopping sequence is communicated to each terminal in the cell once it has been determined. This communication is suitably achieved by the base station including information defining the sequence in each frame it transmits, so that a terminal can obtain the frequency hopping sequence by listening to only one frame.

Figure 3:
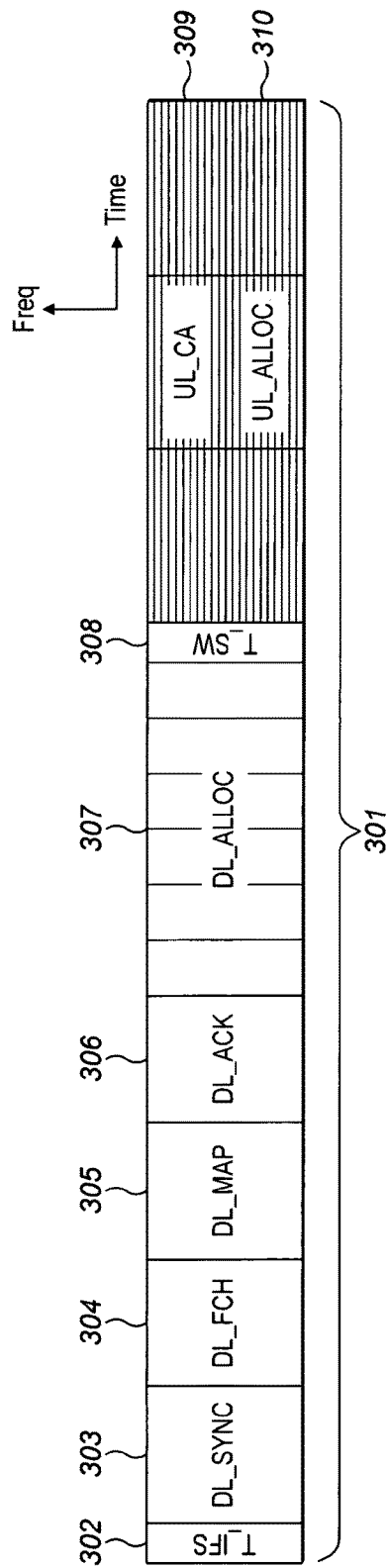
FIG. 3 shows an example of a frame structure.

The network may use medium access control (MAC) to share the same radio resource between multiple terminals. An example of a suitable frame structure is shown in FIG. 3. The frame (shown generally at 301) comprises time to ramp-up to full output power 302 (T_IFS), a synchronisation burst 303 (DL_SYNC), an information field providing the subsequent channel structure 304 (DL_FCH), a map of which information is intended for which terminal 305 (DL_MAP), a field to allow acknowledgement of previous uplink transmissions 306 (DL_ACK) and then the actual information to be sent to terminals 307 (DL_ALLOC). There is then a guard period for ramp-down of the downlink and ramp-up on the uplink 308 (T_SW), followed by channels set aside for uplink contended access 309 (UL_CA) in parallel with the allocated uplink data transmissions 310 (UL_ALLOC).

A suitable hopping rate for the downlink channels may be the frame rate, so that each frame is transmitted (on the downlink) on a different frequency from the preceding frame. The frames for a network designed to operate in white space for machine-to-machine communication may be particularly long. In one example the frames may each be 2 seconds long, giving a frequency hop on the downlink every 2 seconds (which is 30 hops per minute).

The DL_FCH may include information to enable the terminals to determine the hopping sequence. The DL_FCH may include a list of the frequencies that are included in the sequence. One efficient way of communicating this information is by means of a channel map, with a bit being set if the channel is in use in the base station. The DL_FCH may also include a MAC Frame count (16-bit) enabling terminals to determine where the base station is in its hopping pattern.

The DL_MAP informs terminals as to whether there is any information for them in the frame and whether they have an uplink slot reserved for them to transmit information. It comprises a table of terminal identities, the number of slots that their information is spread over and the transmission mode and spreading factors used. All terminals monitoring the frame decode this field to determine whether they need to decode subsequent information. The length of the DL_MAP may be included as part of the DL_FCH. A terminal can determine the position of its assigned slots from the DL_MAP by adding up the number of slots allocated in prior rows in the table.

On the uplink the slots may be numbered from 0 to n on the first FDMA channel, then on the subsequent FDMA channel and so on. The terminal can determine how many slots there are each channel from the length of the frame available for the uplink (that remaining after completion of the downlink) divided by the length of each slot. If a terminal has data requiring multiple slots it would normally be given these consecutively on the same carrier as this both simplifies the terminal transmission and minimises the control information required to describe the slot location. However, it is possible to give the terminal multiple allocations on different carriers (so long as they are not simultaneous) to achieve frequency hopping on the uplink.

The white space database may indicate that an unlicensed user is permitted to use certain channels, e.g. channels that have not been allocated to a licensed user such as a DTV transmission. The available channels may vary in dependence on both location and time. Despite being marked as available, communications on those channels can still be subject to interference from other users and may cause interference to other users. For example, an "available" channel may be subject to emissions from licensed users, like signals from far-distant TV transmitters or spurious emissions from nearby TV transmitters. Other sources of potential interference may include devices operating in other wireless networks, such as Wi-Fi devices, wireless microphones, and other unlicensed users operating in white space. Interference may also be caused by the unintended emissions of devices that are not part of a wireless network, e.g. spurious emissions from faulty electric drills.

The base station may determine that one or more terminals is suffering from interference in dependence on information received from those terminals, in dependence on its own observations, or in dependence on a combination of these factors. The base station may independently deduce that a terminal is suffering from interference if it does not receive an acknowledgement for a message sent to it on a particular frequency in the hopping sequence. The base station may also deduce that a terminal is suffering from interference on one or more frequencies in dependence on information that is sent to it by the terminal. The terminal may send a message to the base station especially to inform it of a failure to receive one or more messages from the base station. The terminal might include the failure information as part of a control message. The control message may be a message in which the terminal informs the base station of the quality of the downlink (comprising, for example, the signal strength and/or bit error rate observed on a particular frequency on the downlink). The terminal may be configured to regularly monitor the quality of the downlink and send the control message on a regular, periodic basis. Alternatively, the terminal may be configured to send the control message on being instructed to do so by the base station. The base station may determine that the terminal is subject to interference on a particular frequency in dependence on the quality of the downlink.

If the base station determines that a number of terminals greater than a predetermined number are suffering from interference on a particular frequency, the base station may be configured to determine that the interference on that frequency is not localised. The base station may be configured to remove the interfered frequency from the frequency hopping sequence for a time, since the interference is affecting a significant number of terminals in the cell. If, however, the interference is determined to relate to a relatively small number of terminals (lower than the predetermined number), the base station may be configured to determine that those terminals are suffering from localised interference and that, consequently, there is no need to remove the interfered frequency from the hopping sequence for the cell as a whole.

Figure 4:
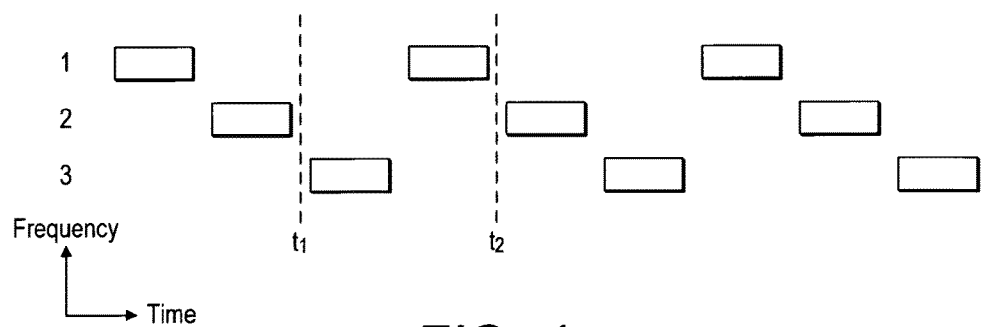
FIG. 4 shows an example of a slot allocation mechanism.

If the base station determines that a terminal is subject to localised interference on a particular frequency, it may schedule future communications with that terminal to avoid the problematic frequency. If those future communications have yet to be scheduled, the base station can simply allocate future communications with the terminal to time slots within the frequency hopping sequence that are on frequencies other than the interfered frequency. The base station may be restrained by a time period within which a communication needs to be scheduled with a particular terminal. For example, in FIG. 4 a communication with a particular terminal should occur between $t_1$ and $t_2$. The base station has two frequencies available to it during this time period: frequency 1 and frequency 3. So if, for example, the terminal is subject to localised interference on frequency 3, the base station may select the time slot on frequency 1 for communicating with the terminal. If there are no time slots within the predetermined time period that will occur on a non-interfered frequency, the base station may be configured to not allocate a time slot for communication with the terminal in that time period. Instead, for example, the base station may schedule a time slot outside the predetermined time period, or may wait to schedule a time slot until the next predetermined time period within which it should communicate with that terminal.

If a future communication with the terminal has already been scheduled for a time slot on the interfered frequency, the base station may reschedule the communication to a time slot that is not on the interfered frequency. The base station preferably communicates any such reallocation to the terminal.

The base station preferably continues scheduling communications with terminals not subject to interference on the interfered frequency in accordance with the frequency hopping sequence.

Figure 5:
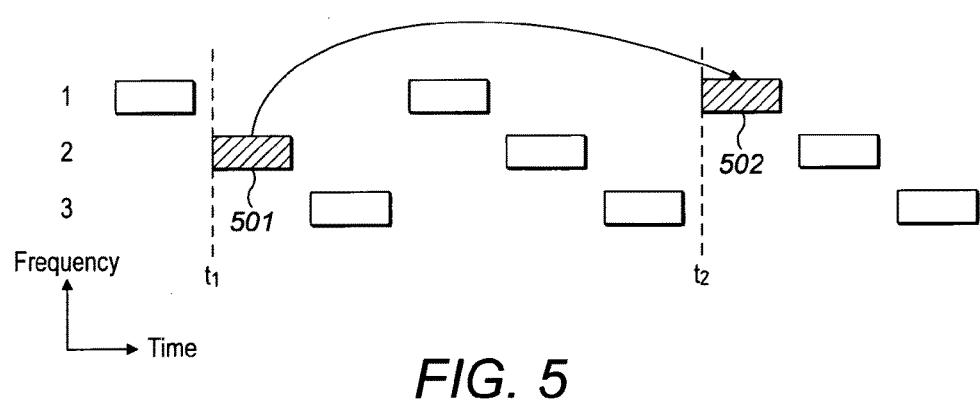
FIG. 5 shows an example of a slot skipping mechanism.

The base station may be configured to communicate with one or more terminals in the cell at regular, predetermined intervals. Scheduling communications in this way may be advantageous in machine-to-machine networks, in which the terminals are often devices having small batteries. By scheduling communications at regular, predetermined intervals, terminals can enter a sleep mode between communications and only wake-up when a communication is expected. If one of these regular communications is scheduled to occur on the interfered frequency, the scheduled communication may be skipped. This is illustrated in FIG. 5, in which a communication between the terminal and the base station is scheduled to occur at time $t_1$ in slot 501. However, the terminal is subject to interference on frequency 2, which this time slot is scheduled to use. Therefore, time slot 501 may be skipped with the communication occurring on the next scheduled slot (time slot 502) instead.

If a scheduled communication is to be skipped, the base station may indicate this to the terminal in advance. Alternatively, the base station and the terminal may independently determine that the next scheduled slot should be skipped without exchanging messages to confirm this. Such independent determinations may be made, on the terminal's side, by it not having successfully received a message from the base station on a particular frequency and, on the base station's side, by it not having received an acknowledgement for the message transmitted on that frequency. As causes other than interference may be responsible for a message being lost, the terminal and base station may be configured only to make such an independent determination of there being localised interference after more than one message on a particular frequency has failed.

A drawback with having the terminal and base station independently determine to skip a scheduled communication is that the terminal and the base station might 'guess' differently as to whether or not a scheduled communication should be skipped. However, in a machine-to-machine network this is not necessarily problematic. Any missed data can simply be resent by the base station and machines are generally tolerant of delays.

The base station may be configured to preferentially schedule communications to avoid the interfered frequency for a predetermined length of time before reinstating that frequency in communications with the terminal. The base station may be arranged to indicate this predetermined length of time to the terminal. If the base station and the terminal are configured to independently determine whether or not to skip a communication, both the base station and the terminal may be configured to skip communications scheduled to occur on the interfered frequency for the predetermined length of time.

For terminals that are configured to enter a sleep mode between communications with the base station, the base station may be configured to schedule future communications with the terminal so that they avoid any frequency on which that terminal is suffering interference. The terminal will then wake-up at a point in the frequency hopping sequence that is on a frequency acceptable to the terminal. The terminal (which may be battery powered, and thus concerned with conserving energy) is therefore able to exit sleep mode and communicate successfully. This avoids a terminal with limited power having to stay awake in order to deal with the retransmissions etc caused by a communication taking place on an interfered-frequency.

The allocation methods described above may be most advantageously applied to the downlink between the base station and the terminal since the localised interference will affect the reception of messages sent from the base station to the terminal rather than the other way around. If the base station is subject to localised interference on a particular frequency, the most appropriate way of dealing with that interference may be for that frequency to be removed from the frequency hopping sequence for a predetermined length of time. It should nonetheless be understood, however, that the allocation methods described above may equally be applied to uplink communications.

The allocation methods described above may be especially advantageous in networks where the base stations and terminals mainly send short bursts of data, e.g. transmissions lasting one or two time slots. A network configured specifically for machine communications will typically fall into this category. Networks in which transmissions are short can deal with interference via scheduling, without having to change the hopping sequence. Networks in which transmissions last for consecutive slots and are intolerant of delay might have to change the hopping sequence.

Figure 6:
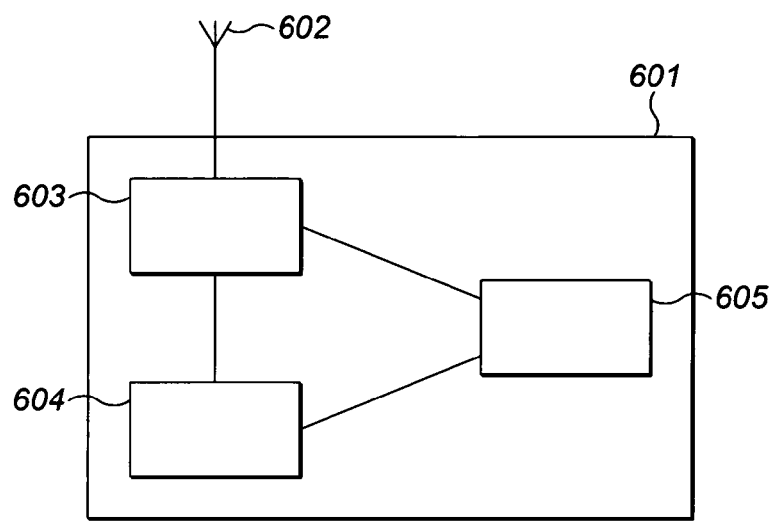
FIG. 6 shows an example of the functional blocks comprised in a communication device.

An example of the functional blocks that may be comprised in a communication device according to one embodiment of the invention are shown in FIG. 6. The communication device, shown generally at 601, comprises a communication unit 603 connected to an antenna 602 for transmitting and receiving messages. The communication device further comprises a monitoring unit 605 for determining when a terminal may be subject to localised interference and a scheduling unit 604 for scheduling communications between the base station and the terminal. The communication unit may effectively act as a central controller for the scheduling process and may pass information between the other functional blocks.

Figure 7:
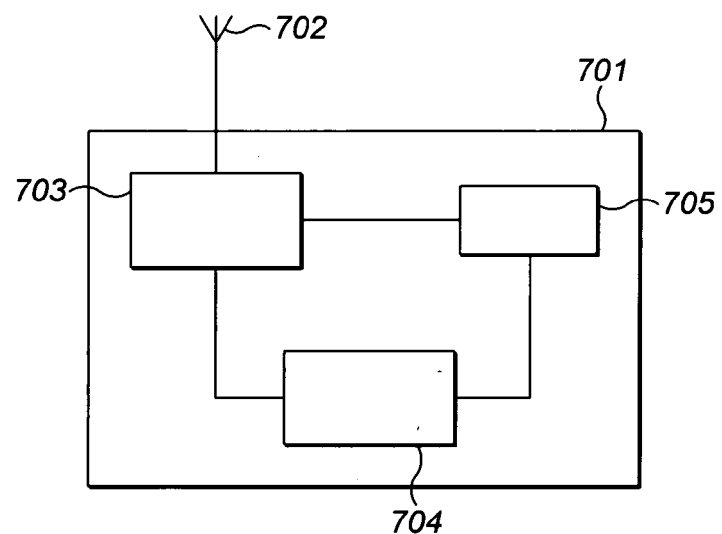
FIG. 7 shows an example of the functional blocks comprised in a communication terminal.

An example of the functional blocks that may be comprised in a terminal according to one embodiment of the invention are shown in FIG. 7. The terminal, shown generally at 701, comprises a communication unit 703 connected to an antenna 702 for transmitting and receiving messages. The terminal further comprises a monitoring unit 704 for analysing whether it is subject to interference on one or more frequencies and a 'skip' unit 705 for determining when a scheduled communication should be skipped as it occurs on an interfered frequency. The communication unit may effectively act as a central controller and may pass information between the other functional blocks.

The apparatus shown in FIGS. 6 and 7 are shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device for communicating with a plurality of terminals using a frequency hopping sequence, the communication device being configured to:
   assign a series of time slots for communication between the communication device and the plurality of terminals, wherein each time slot in the series of time slots is a time period of fixed duration within a frame structure, and wherein each of the time slots in the series of time slots is scheduled to take place on a frequency from the frequency hopping sequence;
   determine that one or more terminals in the plurality of terminals is subject to interference on an interfered frequency in the frequency hopping sequence;

determine that at least one terminal in the plurality of terminals is not subject to interference on the interfered frequency in the frequency hopping sequence;

in response to those determinations, schedule communications with the one or more terminals to avoid the interfered frequency without altering the frequency hopping sequence by skipping communication on any time slot in the series of time slots that is scheduled to take place on the interfered frequency, and continuing to schedule communications with the one or more terminals in timeslots scheduled to take place on frequencies in the frequency hopping sequence other than the interfered frequency in accordance with the frequency hopping sequence, wherein the interfered frequency is not removed from the frequency hopping sequence; and continue to schedule communications with terminals in the plurality of terminals that are not comprised in the one or more terminals in timeslots scheduled to take place on the interfered frequency in accordance with the frequency hopping sequence.

2. The communication device as claimed in claim 1, wherein the communication device is further configured to assign the next communication between the communication device and the terminal to be in a time slot that is, in accordance with the frequency hopping sequence, not scheduled to take place on the interfered frequency.

3. The communication device as claimed in claim 1, wherein the communication device is further configured to:

identify a time period within which a communication should take place between the communication device and the terminal; and assign the communication to take place in a time slot within that time period that is, in accordance with the frequency hopping sequence, not scheduled to take place on the interfered frequency.

4. The communication device as claimed in claim 1, wherein the communication device is further configured to indicate to the terminal that the terminal should skip a time slot that is scheduled to take place on the interfered frequency.

5. The communication device as claimed in claim 1, wherein the communication device is further configured not to indicate to the terminal that the terminal should skip a time slot that is scheduled to take place on the interfered frequency.

6. The communication device as claimed in claim 1, wherein the communication device is configured to determine that the one or more terminals are subject to interference on the interfered frequency in dependence on information received from the one or more terminals.

7. The communication device as claimed in claim 1, wherein the communication device is configured to determine that the one or more terminals are subject to interference on the interfered frequency in dependence on one or more messages transmitted by the communication device to the one or more terminals that the one or more terminals have not acknowledged.

8. The communication device as claimed in claim 1, wherein the communication device is configured to communicate with the plurality of terminals via a wireless network that operates in white space.

9. The communication device as claimed in claim 1, wherein the communication device is configured to communicate with the plurality of terminals via a wireless network that is configured for machine-to-machine communication.

10. The communication device as claimed in claim 1, wherein the communication device is further configured to reschedule a communication of any time slot in the series of time slots that has been skipped to a time slot in the series of time slots that is, according to the frequency hopping sequence, not scheduled to take place on the interfered frequency.

11. A terminal for communicating with a communication device using a frequency hopping sequence, the terminal being configured to:

communicate with the communication device using the frequency hopping sequence in a series of time slots assigned by the communication device, wherein each time slot in the series of time slots is a time period of fixed duration within a frame structure, and wherein each of the time slot in the series of time slots is scheduled to take place on a frequency from the frequency hopping sequence;

determine that the terminal is subject to interference on an interfered frequency in the frequency hopping sequence; and in response to that determination, schedule further communication with the communication device to avoid the interfered frequency without altering the frequency hopping sequence by skipping communication on any time slot in the series of time slots that is scheduled to take place on the interfered frequency, and continuing to schedule communications with the communication device in timeslots scheduled to take place on frequencies in the frequency hopping sequence other than the interfered frequency in accordance with the frequency hopping sequence, wherein the interfered frequency is not removed from the frequency hopping sequence, and wherein the further communication with the communication device uses the frequency hopping sequence.

12. The terminal as claimed in claim 11, wherein the terminal is further configured to determine that it is subject to interference on the interfered frequency in dependence on information received from the communication device.

13. The terminal as claimed in claim 11, wherein the terminal is further configured to determine that it is subject to interference on the interfered frequency in dependence on a communication from the communication device that it did not receive successfully.

14. The terminal as claimed in claim 11, wherein the terminal is further configured to skip an assigned time slot responsive to instructions from the communication device.

15. The terminal as claimed in claim 11, wherein the terminal is further configured to skip an assigned time slot independently of any instructions from the communication device.

16. A method for scheduling communications between a communication device and a plurality of terminals using a frequency hopping sequence, the method comprising:

assigning a series of time slots for communication between the communication device and the plurality of terminals, wherein each time slot in the series of time slots is a time period of fixed duration within a frame structure, and wherein each of the time slots in the series of time slots is scheduled to take place on a frequency from the frequency hopping sequence;

determining that one or more terminals in the plurality of terminals is subject to interference on an interfered frequency in the frequency hopping sequence;

determining that at least one terminal in the plurality of terminals is not subject to the interference on the interfered frequency in the frequency hopping sequence;

in response to those determinations, scheduling communications between the communication device and the one or more terminals to avoid the interfered frequency without altering the frequency hopping sequence by
skipping communication on any time slot in the series of time slots that is scheduled to take place on the interfered frequency, and
continuing to schedule communications with the one or more terminals in timeslots scheduled to take place on frequencies in the frequency hopping sequence other than the interfered frequency in accordance with the frequency hopping sequence, wherein the interfered frequency is not removed from the frequency hopping sequence; and
continuing to schedule communications between the communication device and terminals in the plurality of terminals that are not comprised in the one or more terminals to take place on the interfered frequency in accordance with the frequency hopping sequence.

17. The method as claimed in claim 16, further comprising:
after scheduling communications between the communication device and the one or more terminals to avoid the frequency, rescheduling a communication of any time slot in the series of time slots that has been skipped to a time slot in the series of time slots that is, according to the frequency hopping sequence, not scheduled to take place on the interfered frequency.

* * * * *